May 31, 1927.  1,631,038
W. LA HODNY ET AL
GLASS PLATE FASTENER
Filed May 23, 1924   2 Sheets-Sheet 2
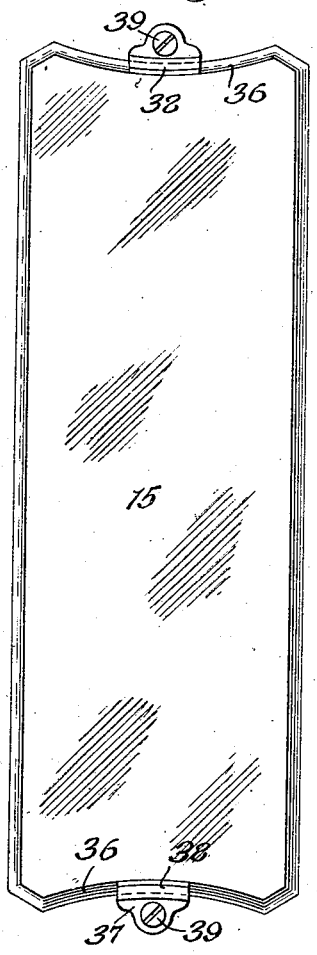
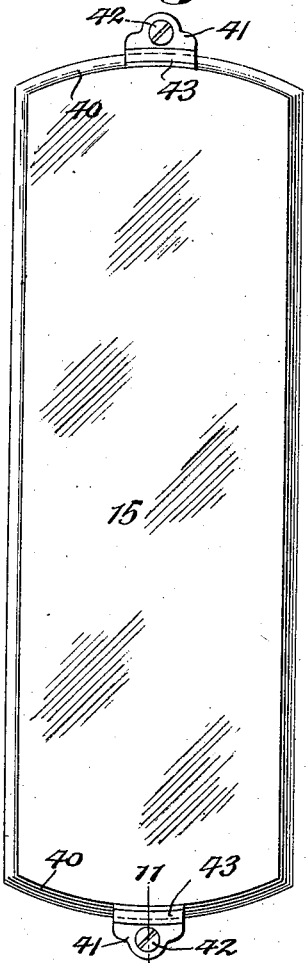
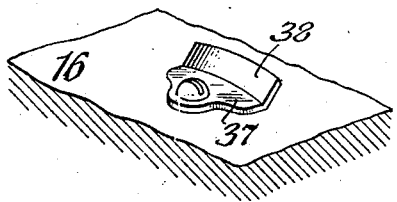
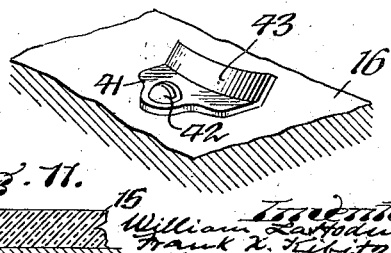
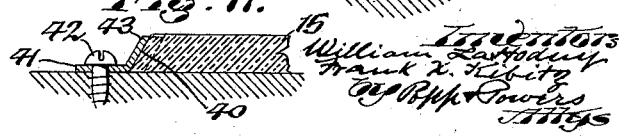

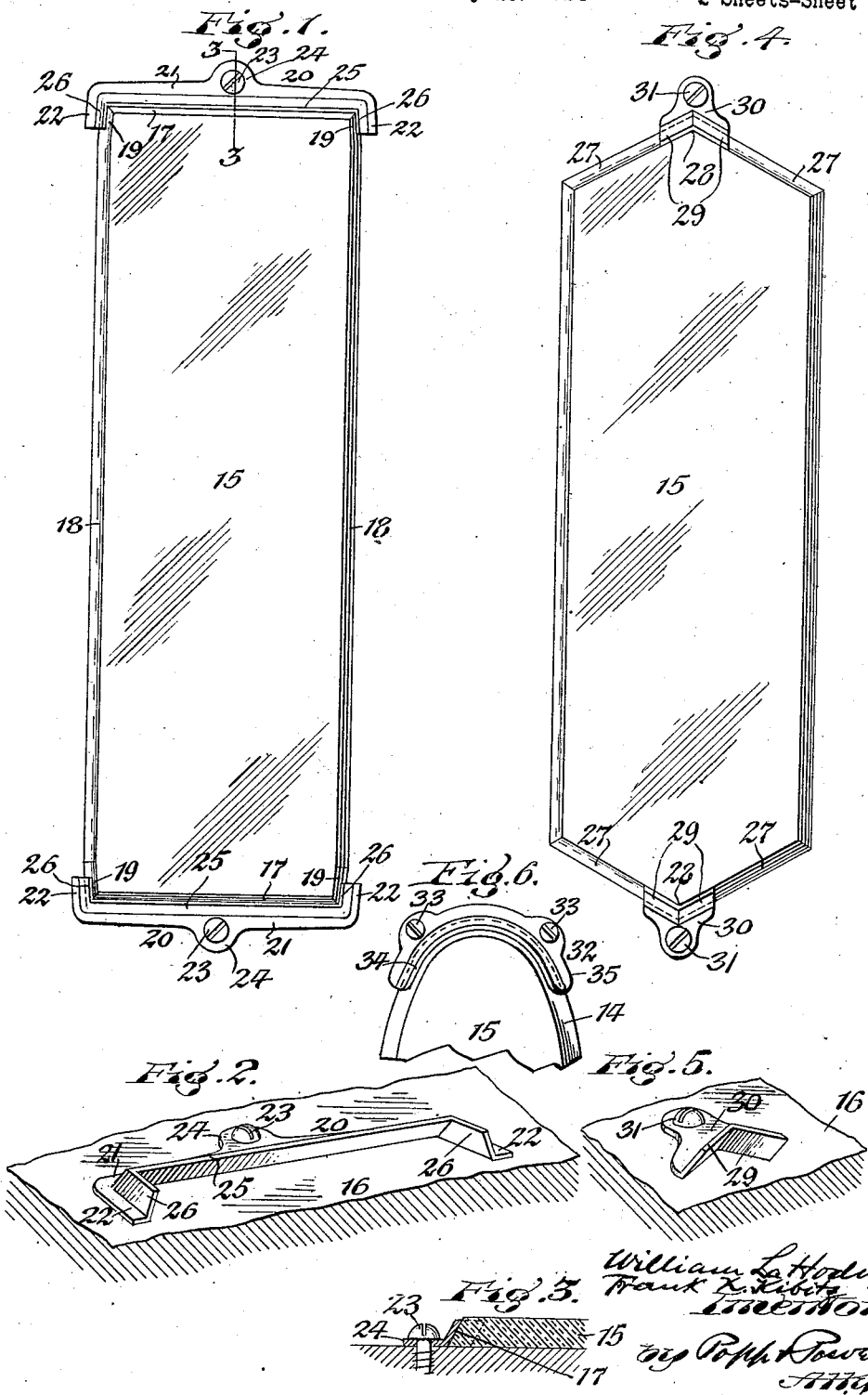
May 31, 1927.
W. LA HODNY ET AL
GLASS PLATE FASTENER
Filed May 23, 1924
1,631,038
2 Sheets-Sheet 1

Patented May 31, 1927.

1,631,038

UNITED STATES PATENT OFFICE.

WILLIAM LA HODNY AND FRANK X. KIBITZ, OF BUFFALO, NEW YORK, ASSIGNORS TO STANDARD MIRROR COMPANY, INC., OF BUFFALO, NEW YORK, A CORPORATION OF NEW YORK.

GLASS-PLATE FASTENER.

Application filed May 23, 1924. Serial No. 715,495.

This invention relates to a fastener for holding glass plates, such as door push plates, on the surfaces intended to receive and support the same.

Ordinarily push plates, as heretofore constructed, were provided with holes extending through the same, and the same were held in place on the surface on which they were mounted by means of screws passing through these holes and into the surfaces designed to carry the plate. In order to reduce the liability of breakage it has been customary to surround the screws within the holes of the plate by a rubber bushing and also interpose a washer between the head of the screw and the plate to cover the hole which was necessarily large to take in the shank of the screws and its surrounding bushing. This prior form of push plate and the manner of mounting the same has been found unsatisfactory for several reasons which are principally as follows:

When drilling a hole in the glass plate it often happens that small cracks are formed around the edge of the hole which are hardly visible but which, when subjecting the plate to a shock or undue pressure, will, without warning, extend to a near part of the outer edge of the glass plate and thereby mar the plate, if not rendering the same unserviceable. Such cracking of the glass plate may occur any time, even after the same has been mounted on a door and used for some time.

Another cause for breakage of glass plates having screw holes is due to carelessness of workmen when putting screws in askew which produces unequal pressure on the glass plates and often results in fracturing the same, particularly when the same is subjected to a sudden shock or blow. Breakages of this character have been known to injure persons who unknowingly bring their hands in contact with the broken or cracked plates and are seriously cut by the same.

This old form of push plate is also the cause of annoyance when replacing a broken plate with a new one, inasmuch as it often happens that the holes in the new plate do not match the holes in the old glass and this necessitates making new holes and leaving unsightly scars on the woodwork due to the old unused holes which are visible through the glass plates.

The fastening of glass plates by passing screws through holes therein is further objectionable on account of the liability of breakage due to changes in temperature, it being a common occurrence that plates fastened in cold weather will subsequently crack when the building is heated and thus cause the plate to expand and become broken.

The fracture of the glass plates in this manner is also liable to occur when the same are attached to green doors inasmuch as subsequent drying of the door or supporting surface will cause the same to contract or shrink and produce a pressure of the screws on the holes of the glass plate and crack the latter.

Push plates as heretofore constructed and mounted have been further undesirable on account of the liability of striking the hands against the fastening screws when wiping the front side of the plates and also the unsanitary condition of the same due to the gathering of dirt around the screws and the difficulty in removing this dirt and the consequent unsightly appearance of the same.

It is the object of this invention to provide means for mounting glass plates on doors and the like so as to overcome the above mentioned objections and to that end this invention consists in the device which will now be fully set forth.

In the accompanying drawings:

Figure 1 is a front elevation of one embodiment of our invention.

Figure 2 is a fragmentary sectional perspective view of the same.

Figure 3 is a fragmentary section, taken on line 3—3, Figure 1.

Figure 4 is a front elevation showing a modification of our invention when applied to a glass push plate having V-shaped ends.

Figure 5 is a fragmentary sectional perspective view of the last mentioned construction.

Figure 6 is a fragmentary front elevation of a form of our invention when used for fastening a push plate which is of oval outline.

Figure 7 is a front view showing the manner of securing a plate having concave transverse ends in accordance with our invention.

Figure 8 is a fragmentary sectional perspective view of the same.

Figure 9 is a front view of a plate having convex transverse edges and secured by another form of our invention.

Figure 10 is a fragmentary sectional perspective view thereof.

Figure 11 is a fragmentary section taken on the correspondingly numbered line in Figure 9.

Similar characters of reference indicate like parts throughout the several views.

The numeral 15 represents the glass plate in the several forms herein shown, the same in this instance being a push plate or hand plate which is mounted on a door 16 of wood, or similar supporting surface.

In the form of this plate, as shown in Figure 1, the same is of substantially rectangular form in outline and provided with straight transverse edges 17, 17 at its narrow ends while the main central parts 18 of the longitudinal edges of its wide sides are straight and parallel and the extreme end portions 19 of the side edges are inclined lengthwise and form bearing faces so that the pair of bearing faces at each narrow end of the plate converge toward the corresponding transverse edge 17.

In the preferred construction the transverse end edges 17 of the plate and the bearing faces 19 are beveled or inclined from the rear side of the plate inwardly toward the front side thereof, as shown in Figures 1 and 3, and the longitudinal edges 18 are also preferably beveled, as shown in Figure 1.

At each end of the glass plate the same is secured to the support 16 by a clip or fastening which in the form shown in Figures 1, 2 and 3 is constructed as follows:

The numeral 20 represents a base having a cross bar 21 and inwardly projecting arms 22 at the ends of the bar so that the same is of substantially U-form. This base is adapted to engage the supporting surface at one end of the plate and to be secured to said surface by any suitable means, such for example, as a screw 23 passing through a perforated ear 24 on the central part of said base.

Rising from the inner part of the base is a retaining flange having a transverse central part 25 and two inwardly projecting parts 26 at opposite ends of the central part so that as a whole this flange is of U-form similar to its base. The parts 25, 26 of the flange are inclined inwardly and the central part 25 engages with a transverse edge of the plate and the end portions 26 of the same diverge relatively to this edge and engage with the laterally converging bearing faces 19 on the corresponding end of the plate. By thus engaging the inclined flanges of the clips or fastenings with the beveled surfaces at opposite ends of the glass plate in this manner the latter is securely held in place on the door or other surface on which the same is mounted. When the clips or fastenings are constructed with corners which engage with the corners of the plate only one screw is required for securing the clip to the surface and still keep the same and the plate in place.

The cooperating beveled surfaces of the clips and plate permit of variations in the thickness of the glass and also slight variations in the angle of the bevel on the glass without interfering with the drawing of the plate against its supporting surface. Moreover, by constructing the bearing faces 19 at each end of the plate of laterally converging form and the end flanges of the arms on the base of inwardly diverging form these parts are engaged with a wedging fit and thus permit of applying each clip to an end of the plate even though the same may be slightly inaccurate and thereby enable the clip to properly engage the plate and compensate for any slight difference in manufacture of the plate which is liable to occur without interfering with the mounting of the same.

The clips engage only with the edges of the plate so as to avoid any part of the same projecting above the front surface of the plate. In the preferred construction this is preferably accomplished by terminating the front ends of the retaining flanges slightly below the front surface of the plate, as shown in Figure 3. By this means it is possible to wipe off the front face of the plate with a cloth for cleaning the same with ease and facility without liability of the cloth being caught on any obstruction or the hand being injured by engagement therewith as is often the case when wiping off push plates in which the fastenings of the same project forwardly beyond the front side of the plate.

If desired the opposite transverse ends of the plate may be made in the form of outwardly projecting V-shapes as shown at 27 in Figure 4, thereby forming a corner 28 between the two sides of each V-shape which are beveled. Each of these corners is engaged by the V-shaped and beveled flanges 29 rising from the correspondingly shaped base 30 of a clip or fastening which is secured with its central part to the support or supporting surface by a screw 31. The front end of this clip is flush with or slightly below the front side of the plate so as to permit of cleaning the front side of the plate by wiping freely over the entire surface of the same.

In case the plate has an oval outline 14 as shown in Figure 6, the clip 32 is made of correspondingly curved form to fit a convex curved end of the plate and is secured to the supporting surface by a plurality of screws 33, preferably two, both the edge of the plate and the flange 34 rising from the base 35 of the clip being beveled and the front end of the flange being below or flush with the front face of the plate.

In Figures 7 and 8 is shown a form of clip or fastening adapted to mount a plate having its ends provided with concave curved transverse edges 36. In this case each clip has its base 37 provided with a forwardly projecting flange 38 which is beveled and curved convex to fit the beveled and concave curved edge 36. Each of these clips is secured by a screw 39 to the support and its flange does not rise above the front side of the plate.

Similarly a plate having its ends provided with beveled convex edges 40, as shown in Figure 9, is mounted on a support by clips each of which has a base 41 secured to the support by a screw 42 and is provided with a forwardly projecting concave and beveled curved flange 43 fitting the correspondingly shaped edge 40 and terminating below the front surface of the plate.

From the foregoing description it will be evident that the absence of holes in the glass plate ensures solidity thereof, that cleaning of the front side of the plate is facilitated, no loose threads or lint from the washing cloth can be caught, and liability of injury is eliminated by reason of the surface of this glass being unobstructed.

Moreover, the employment of fastenings or clips which are attached to the support beyond the outline of the plate prevents the pressure of the screws from breaking the plate particularly where the screws do not go in straight and bear at an angle, and in case new screw holes are made when mounting a new glass the old holes are covered by the clips so that scars on the woodwork are not visible.

In addition to this these plates are not liable to be broken during transportation owing to the absence of small cracks such as those around the holes in plates as heretofore used.

We claim as our invention:

A fastener for attaching to a surface a glass plate having longitudinal edges, transverse edges and bearing faces converging from the opposite longitudinal edges toward said transverse edges, comprising a base adapted to be secured to said surface and a flange rising from said base and having a transverse central part adapted to engage with a transverse edge of the plate and two end parts diverging inwardly from opposite ends of said transverse part and adapted to engage with said bearing faces, said transverse edges of the plate being beveled and the flange portions of the fastener engaging therewith being correspondingly beveled, and the upper sides of said flange portions terminating below the front side of said plate.

WILLIAM LA HODNY.
FRANK X. KIBITZ.